United States Patent [19]

Chang

[11] Patent Number: 4,934,490
[45] Date of Patent: Jun. 19, 1990

[54] ANTI-ROLL DEVICE FOR VEHICLES

[76] Inventor: Deng J. Chang, No. 28-2, Pan Chih Hua Keng, Tung Yuan Villiage, Tung Shan Hsiang, Tainan Hsien, Taiwan

[21] Appl. No.: 322,925

[22] Filed: Mar. 14, 1989

[51] Int. Cl.5 .................. B60T 1/00; F16D 63/00; F16D 65/10; F16D 69/00

[52] U.S. Cl. .................................... 180/31; 188/82.1; 188/265; 188/218 XL; 192/4 A

[58] Field of Search .................. 188/1.11, 265, 353, 188/156, 218 XL, 82.7, 82.1, 82.8, 82.84, 31; 192/4 A

[56] References Cited

U.S. PATENT DOCUMENTS

| | | | |
|---|---|---|---|
| 1,967,698 | 7/1934 | Whyte | 192/4 A |
| 2,216,566 | 10/1940 | Erikson | 192/4 A |
| 2,961,073 | 11/1960 | Legge et al. | 188/265 X |
| 2,974,752 | 3/1961 | Howard | 188/265 X |
| 3,923,127 | 12/1975 | Radcliff et al. | 188/82.1 |
| 4,715,483 | 12/1987 | Hobson et al. | 192/4 A |

Primary Examiner—Robert J. Oberleitner
Attorney, Agent, or Firm—Morton J. Rosenberg; David I. Klein

[57] ABSTRACT

An anti-roll device for vehicles, especially for those with standard gearshift, including a brake disc having ratchet gear on its peripheral surface; a link engageable with the ratchet gear; a solenoid valve connecting to and actuating the link and controlling the engagement between the link and the ratchet gear of the brake disc; a switch controlling the on and off conditions of the solenoid valve; a microswitch connecting to the solenoid valve; an indicating light controlled by the microswitch; and a buzzer, also controlled by the microswitch, connecting in parallel with the indicating light. The link is actuated by the solenoid valve to engage with the rachet gear of the brake disc so that the brake disc and the wheel of a vehicle can only rotate counterclockwise, therefore preventing the vehicle from sliding backward on an incline or a hill.

1 Claim, 3 Drawing Sheets

ANTI-ROLL DEVICE FOR VEHICLES

BACKGROUND OF THE INVENTION

The present invention relates generally to an anti-roll device for vehicles, and more particularly, to an anti-roll device for vehicles which comprises a link being operable by a solenoid value so as to engage the ratchet gear of the brake disc of the wheel assembly.

Vehicles, especially those with standard gear shift, often require the use of the hand brake while on a hill in order to prevent the vehicles from rolling down the hill. Frequently, the engine will stop due to bad or careless driving skill.

SUMMARY OF THE INVENTION

It is therefore a primary object of the present invention to provide an anti-roll device for vehicles, in which the wheel assembly can be controlled by the anti-roll device to move counterclockwise only so that the vehicle will not roll down (backwards) while on a hill or an incline.

The present invention provides an anti-roll device for vehicles especially for those with standard gearshift comprising a brake disc having a ratchet gear on the peripheral surface, a link engageable with the ratchet gear, a solenoid value connecting to the link for actuating the same and controlling the engagement between the link and the ratchet gear of the brake disc, a switch controlling the on and off conditions of the solenoid value, a microswitch connecting to the solenoid value, an indicating light controlled by the microswitch, and a buzzer connected in parallel to the indicating light. The link can be actuated by the solenoid value to engage the rachet gear of the brake disc so that the brake disc and the wheel of the vehicle connected thereto rotate counterclockwise only, thereby preventing the vehicle from rolling down the hill.

These and other objects and advantages of the present invention will become apparent after a reading of the detailed description provided hereinbelow, with appropriate reference to the accompanying drawings.

DETAILED DESCRIPTION OF THE PREFERRED EMBODIMENT

Figure 1:
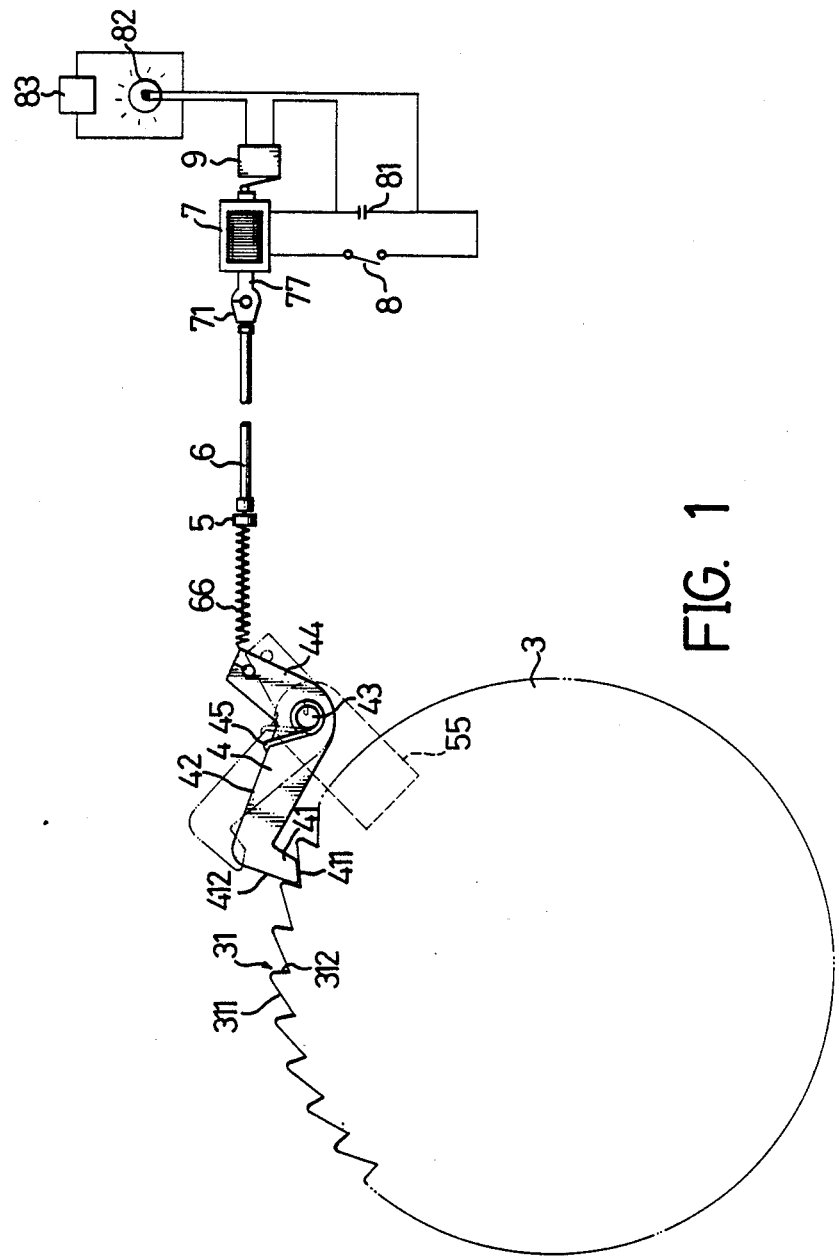
FIG. 1 is a schematic view of an anti-roll device for vehicles in accordance with the present invention.
Figure 2:
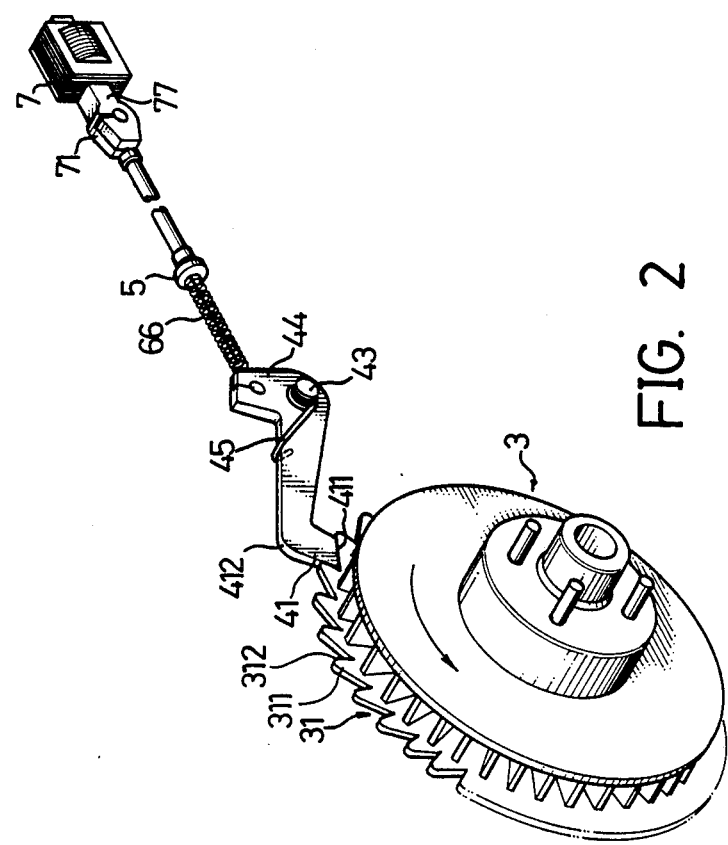
FIG. 2 is a perspective view of the anti-roll device of FIG. 1, illustrating the relative position between the brake disc and the link.
Figure 3:
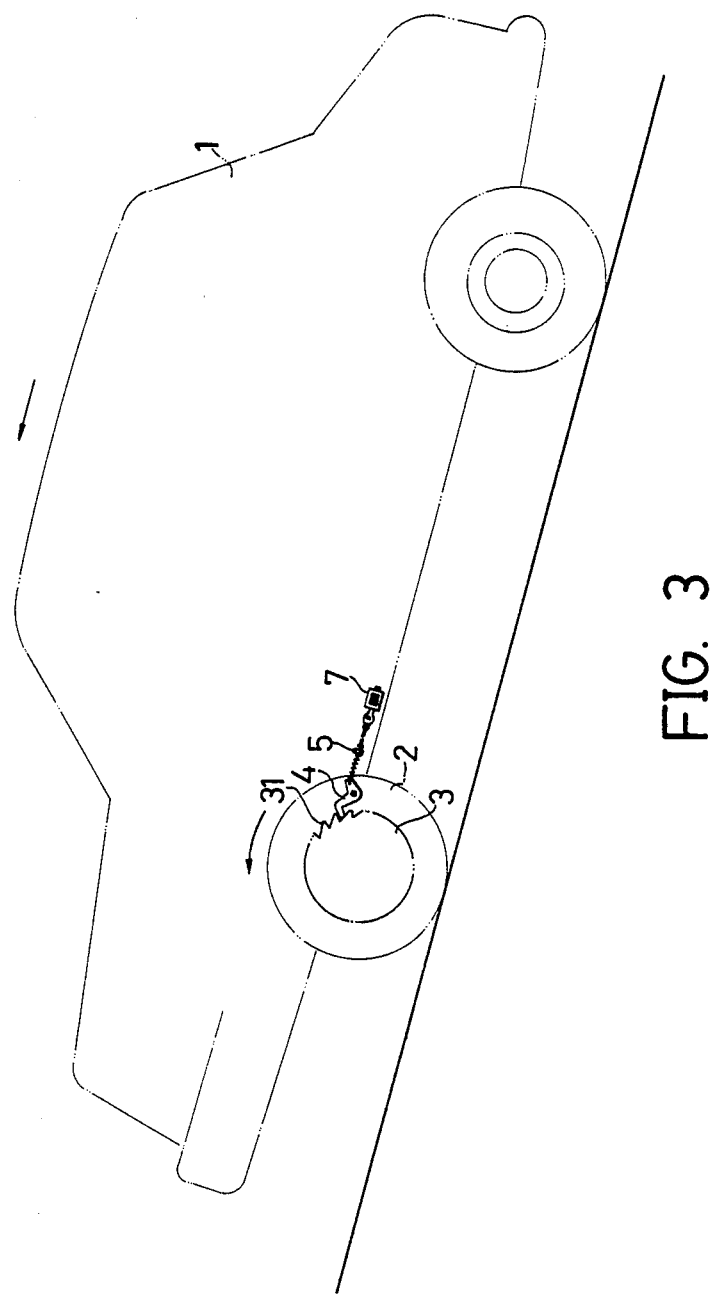
FIG. 3 is a working view of the anti-roll device of FIG. 1 in a vehicle.

Referring to the drawings, it can be seen that an anti-roll device in accordance with the present invention includes generally a brake disc 3 of a wheel assembly 2 having a ratchet gear 31 on the peripheral surface, a link (or a pawl) 4 engageable with the ratchet gear 31, and a solenoid value connecting to the link 4 for controlling the movement of the link 4 and the engagement between the link 4 and the ratchet gear 31.

Each tooth of the ratchet gear 31 has two faces, one face of which is an inclined surface 311, the other face being substantially a vertical surface 312. The shape of the link 4 is similar to the letter "N". One corner of the link 4 is pivotable about a pin 43 which is fixed relative to the axle of the wheel assembly 2 by a bracket 55 (as shown by dotted lines in FIG. 1) so that the pin 43 moves with the wheel assembly 2. The leg portion 41 of the link 4 is provided with a first surface 411 and a second surface 412, the first surface 411 of the leg portion 41 slidably contacting the inclined surface 311, and the second surface 412 compressively contacting the vertical surface 312 of the ratchet gear 31. A spring 45 is fixed to one end of the pin 43, and the other end of the spring presses the middle leg 42 of the link 4 so that the leg portion 41.is meshable with the teeth of the ratchet gear 31.

A wire 6, which is made of steel or similar materials, is connected at one end thereof to the free end of the link leg 44. The other end of the wire 6 is connected to the joint 71 (e.g., a pivot joint) of a solenoid value 7. The wire 6 can be protected by a flexible rubber or plastic tube. A stop 5, such as a ring, a cylinder or the like, is fixed to the body of the vehicle between the two ends of the wire 6. A spring 66 is provided on the wire 6 between the free end of the leg 44 and the stop 5.

The joint 71 is located on one end of a core 77 of the solenoid value 7. The core 77 is slidably located within the value 7 which is connected to a switch 8 and a power source 81. An indicating light 82 and a musical box 83, such as a chime or a buzzer, are connected in parallel to the power source 81. A microswitch 9 is electrically connected to both the indicating light 82 and the buzzer 83 for controlling the power of the light 82 and the buzzer 83. The microswitch 9 is located beside the solenoid value 7 and controlled by the core 77 of the solenoid value 7. The switch 8 and the indicating light 82 and/or the buzzer 83 are provided on the control panel of the vehicle.

Initially, the switch 8 is open, the core 77 of the solenoid value 7 is non-operative and is pressed to turn off the microswitch 9. The light 82 and the buzzer 83 are then in off condition. In addition, the link 4 is disengaged from the brake disc 3 by the wire 6 such that the brake disc 3 can rotate freely.

Vehicles with standard gearshift are often required to stop and go on a hill or an incline; generally, the driver has to frequently use the hand brake in order to prevent the vehicle from rolling down the hill. The present invention requires only "one touch", i.e., depressing the switch 8. When the switch 8 is switched on by the driver, the core 77 is actuated forward by the solenoid value 7, the link 4 is pressed down to the meshing position by springs 45 and 66. In meshing position, the second surface 412 of the leg portion 41 compressively contacts the vertical surface 312 of the ratchet gear 31, and the first surface 411 of the leg portion 41 slidably contacts with the inclined surface 311. Therefore, the ratchet gear 31 and the wheel assembly 2 are only rotatable in the counterclockwise direction.

Simultaneously with the core 77 being actuated to move forward, the nmicroswitch 9 is switched on , thereby closing the circuit for the light 82 and the buzzer 83. Therefore, the indicating light 82 is lighted up and the buzzer 83 produces music, therefore clearly indicating that the anti-roll device according to the present invention is in operating condition.

The above description of the anti-roll device is an embodiment for easy illustration of the present invention. Nevertheless, other more complex structures and functions are also possible, as will be explained below.

As long as the link 4 is properly positioned, it is not necessary that it must be in the shape of an "N". For example, it could be in the shape of an "L" or simply an "I", provided one of its free legs is meshable with the ratchet gear.

Without spring 66 and stop 5, the link 4 also would be pressed to the working position by the spring 45.

The indicating light 82 and the buzzer 83 are optional, they can also be replaced by any other indicating means, such as a digital or analogue displayer, for showing that the solenoid value 7 is in working condition.

The indicating light 82 and the buzzer 83 could be connected in parallel with the power source and controlled directly by the switch 8 instead of being controlled by the microswitch 9.

Instead of applying the ratchet gear to the brake disc, a ratchet-gear wheel could be fixed directly to the axle of the wheel assembly for meshing with the link, similar to a ratchet-and-pawl assembly, thereby also preventing the vehicle from rolling down the hill.

I claim:
1. An anti-roll device for a vehicle comprising:
   a brake disc having a ratchet gear defining teeth provided on a peripheral surface thereof, each tooth of said ratchet gear having an inclined surface and a vertical surface;
   a link being substantially N-shaped, said link being pivotally rotatable so that a first leg of said link is engageable with said teeth of said ratchet gear;
   a spring element being provided on a pivot axle of said link and pressing said first leg of said link downward;
   a solenoid value having a core connected to a free end of a second leg of said link by a wire, said core being actuated to slide longitudinally in said solenoid value;
   a switch being electrically connected to said solenoid value for controlling an on/off condition of said solenoid value;
   said first leg of said link being pressed downward by said spring to engage with said teeth of said ratchet gear so as to limit a rotation of said brake disc; and,
   said second leg of said link being retracted by said core so that said first leg of said link is disengaged from said ratchet gear.

* * * * *